US009007255B2

(12) United States Patent
Jarvis

(10) Patent No.: US 9,007,255 B2
(45) Date of Patent: Apr. 14, 2015

(54) DISPLAY OF INFORMATION RELATED TO A DETECTED RADAR SIGNAL

(75) Inventor: George A. Jarvis, Saint Peters, MO (US)

(73) Assignee: The Boeing Company, Chicago, IL (US)

( * ) Notice: Subject to any disclaimer, the term of this patent is extended or adjusted under 35 U.S.C. 154(b) by 285 days.

(21) Appl. No.: 13/607,451

(22) Filed: Sep. 7, 2012

(65) Prior Publication Data

US 2014/0225764 A1 Aug. 14, 2014

(51) Int. Cl.
G01S 11/06 (2006.01)
G01S 7/04 (2006.01)
G01S 7/02 (2006.01)
G01S 7/40 (2006.01)

(52) U.S. Cl.
CPC ............... *G01S 11/06* (2013.01); *G01S 7/022* (2013.01); *G01S 7/04* (2013.01); *G01S 7/40* (2013.01)

(58) Field of Classification Search
CPC .......... G01S 11/06; G01S 7/40; G01S 7/022; G01S 7/04
USPC .......................................................... 342/20
See application file for complete search history.

(56) References Cited

U.S. PATENT DOCUMENTS

| 4,182,990 | A | * | 1/1980 | Coffin et al. ................... 340/600 |
| 4,668,952 | A | * | 5/1987 | Imazeki et al. ................. 342/20 |
| 4,949,088 | A | | 8/1990 | Ryan et al. |
| 5,151,701 | A | * | 9/1992 | Valentine et al. ............... 342/20 |
| 5,815,092 | A | * | 9/1998 | Gregg et al. ................... 340/936 |
| 6,201,493 | B1 | * | 3/2001 | Silverman ....................... 342/20 |
| 6,204,798 | B1 | * | 3/2001 | Fleming, III .................... 342/20 |
| 6,400,305 | B1 | * | 6/2002 | Kuhn ............................. 342/20 |
| 6,483,452 | B1 | * | 11/2002 | Iwakini .......................... 342/20 |
| 6,819,263 | B1 | * | 11/2004 | Kelly ............................ 340/936 |
| 6,861,970 | B1 | * | 3/2005 | Garland ......................... 342/20 |
| RE39,038 | E | * | 3/2006 | Fleming, III .................... 342/20 |
| RE40,653 | E | * | 3/2009 | Fleming, III .................... 342/20 |
| RE41,905 | E | * | 11/2010 | Fleming, III .................... 342/20 |
| 7,999,721 | B2 | | 8/2011 | Orr |
| 8,248,270 | B2 | * | 8/2012 | Nieves .......................... 340/905 |

(Continued)

OTHER PUBLICATIONS

Built-in full band speed Radar detector 5.0 HD touch screen GPS Navigator Support three-dimensional map FM MP3 Drop ship, retrieved from the Internet—http://www.aliexpress.com/product-fm/537569415-built-in-full-band; Jul. 23, 2012; (5 pgs).

(Continued)

*Primary Examiner* — Matthew M Barker
(74) *Attorney, Agent, or Firm* — Toler Law Group, PC

(57) ABSTRACT

A particular method includes receiving, at a vehicle navigation system, signal strength data indicating strength of a detected radar signal. The method also includes estimating a distance from a vehicle associated with the vehicle navigation system to a source of the detected radar signal based on the signal strength data. The method further includes generating a display that includes a graphical representation related to the source of the detected radar signal. The graphical representation related to the source of the detected radar signal is displayed in a manner that provides information regarding the estimated distance from the vehicle to the source.

20 Claims, 11 Drawing Sheets

(56) References Cited

U.S. PATENT DOCUMENTS

| | | | |
|---|---|---|---|
| 2002/0135504 A1* | 9/2002 | Singer | 342/20 |
| 2003/0006888 A1* | 1/2003 | Burchette et al. | 340/425.5 |
| 2006/0132349 A1* | 6/2006 | Stern et al. | 342/20 |
| 2008/0036994 A1* | 2/2008 | Garland | 356/4.01 |
| 2010/0235779 A1* | 9/2010 | Maeda et al. | 715/781 |
| 2011/0102232 A1 | 5/2011 | Orr et al. | |

OTHER PUBLICATIONS

Extended European Search Report for Application No. 13179030.5, dated Sep. 22, 2014, 6 pages.

* cited by examiner

DISPLAY OF INFORMATION RELATED TO A DETECTED RADAR SIGNAL

FIELD OF THE DISCLOSURE

The present disclosure is generally related to display of information related to a detected radar signal.

BACKGROUND

In some areas, police use radar to enforce traffic laws. Police radar generally operates in an X band, a K band or a Ka band. Police also occasionally use optical systems, e.g., laser based systems, for speed detection. Commercial devices that are generally referred to as radar detectors are capable of detecting radar and/or laser signals from police speed detection systems and providing a warning to a driver that a police speed detection system is in use nearby. For example, a radar detector may provide an audible alert. In another example, the radar detector may include a display, such as a set of light emitting diodes (LEDs), to indicate an approximate strength of a detected signal.

SUMMARY

Many vehicles include an integrated or portable navigation system with a display to display maps and other navigation information. In a particular embodiment, when a radar detector detects a signal, the radar detector may communicate signal strength data to a vehicle navigation system. The vehicle navigation system may use the signal strength data, and possibly other data (e.g., map data, route data, topographic data, etc.), to provide a display that graphically represents information descriptive of or related to a source of the signal. For example, the vehicle navigation system may generate a display that graphically represents the vehicle on a map to indicate a current location of the vehicle. When the vehicle navigation system receives the signal strength data, the vehicle navigation system may update the display to provide information that graphically represents the signal strength to a user. To illustrate, the display may be updated to include a geometric shape. The geometric shape may be sized, color coded, or otherwise shown in a manner that indicates to the user an approximate location of or distance to a source of the signal from the vehicle. By graphically representing information related to the signal, the user, who may be driving, is able to quickly process the information and make decisions based on the information.

In a particular embodiment, a method includes receiving, at a vehicle navigation system, signal strength data indicating strength of a detected radar signal. The method also includes estimating a distance from a vehicle associated with the vehicle navigation system to a source of the detected radar signal based on the signal strength data. The method further includes generating a display that includes a graphical representation related to the source of the detected radar signal. The graphical representation related to the source of the detected radar signal is displayed in a manner that provides information regarding the estimated distance from the vehicle to the source.

In another embodiment, a computer-readable medium includes instructions that are executable by a processor to cause the processor to receive signal strength data from a radar detection device. The signal strength data indicates strength of a detected radar signal. The instructions are further executable to cause the processor to estimate, based on the signal strength data, a distance from a vehicle associated with the radar detection device to a source of the detected radar signal. The instructions are further executable to cause the processor to generate a display that includes a graphical representation related to the source of the detected radar signal. The graphical representation of the source is displayed in a manner that provides information regarding the estimated distance from the vehicle to the source.

In another embodiment, a system includes a processor and a memory accessible to the processor. The memory stores instructions that are executable by the processor to cause the processor to receive signal strength data from a radar detection device. The signal strength data indicates a strength of a detected radar signal. The instructions are further executable to cause the processor to estimate, based on the signal strength data, a distance from a vehicle associated with the radar detection device to a source of the detected radar signal. The instructions are further executable to cause the processor to generate a display that includes a graphical representation related to the source. The graphical representation related to the source is displayed in a manner that provides information regarding the estimated distance from the vehicle to the source.

The features, functions, and advantages that are described herein can be achieved independently in various embodiments or may be combined in yet other embodiments, further details of which are disclosed with reference to the following description and drawings.

DETAILED DESCRIPTION

Particular embodiments disclosed herein use signal strength data communicated from a radar detector to generate a graphical representation at a vehicle navigation system display. In some embodiments, the radar detector and the vehicle navigation system are separate components that communicate via a wired or wireless data link within a vehicle, such as an automobile or another land vehicle. In a particular embodiment, the vehicle navigation system includes a display that is configured to present vehicle navigation information, such as maps, planned routes, etc., and a processor that is configured to process map data, route data, and other navigation data (e.g., Global Positioning System signals).

The vehicle navigation system may also be adapted to process the signal strength data from the radar detector to determine (e.g., estimate) information about a source of a radar signal detected by the radar detector. The vehicle navigation system may present the information as a graphical representation via the display. The graphical representation may provide information using visual cues that are quickly and easily understandable by a user, such as a driver of the vehicle. To illustrate, the graphical representation may display map data indicating a location of the vehicle and a geometric shape that is associated with a source of a detected radar signal. The geometric shape may be displayed in a manner that conveys to the user information about an expected location of the source of the detected radar signal. For example, the geometric shape may be color coded in a manner that indicates a likelihood that the source of the radar has locked on to the vehicle (i.e., focused on the vehicle for speed assessment). In another example, the geometric shape may flash or not flash depending on the likelihood that the source of the radar has locked on to the vehicle. In another example, a size of the geometric shape in the display may be selected based on the signal strength data. In yet another example, a shape of the geometric shape may be selected based on the signal strength data in combination with other data, such as signal direction data, map data, topographic data, route data, other data (e.g., weather information, building locations, terrain effects, radar source direction), or a combination thereof.

Figure 1:
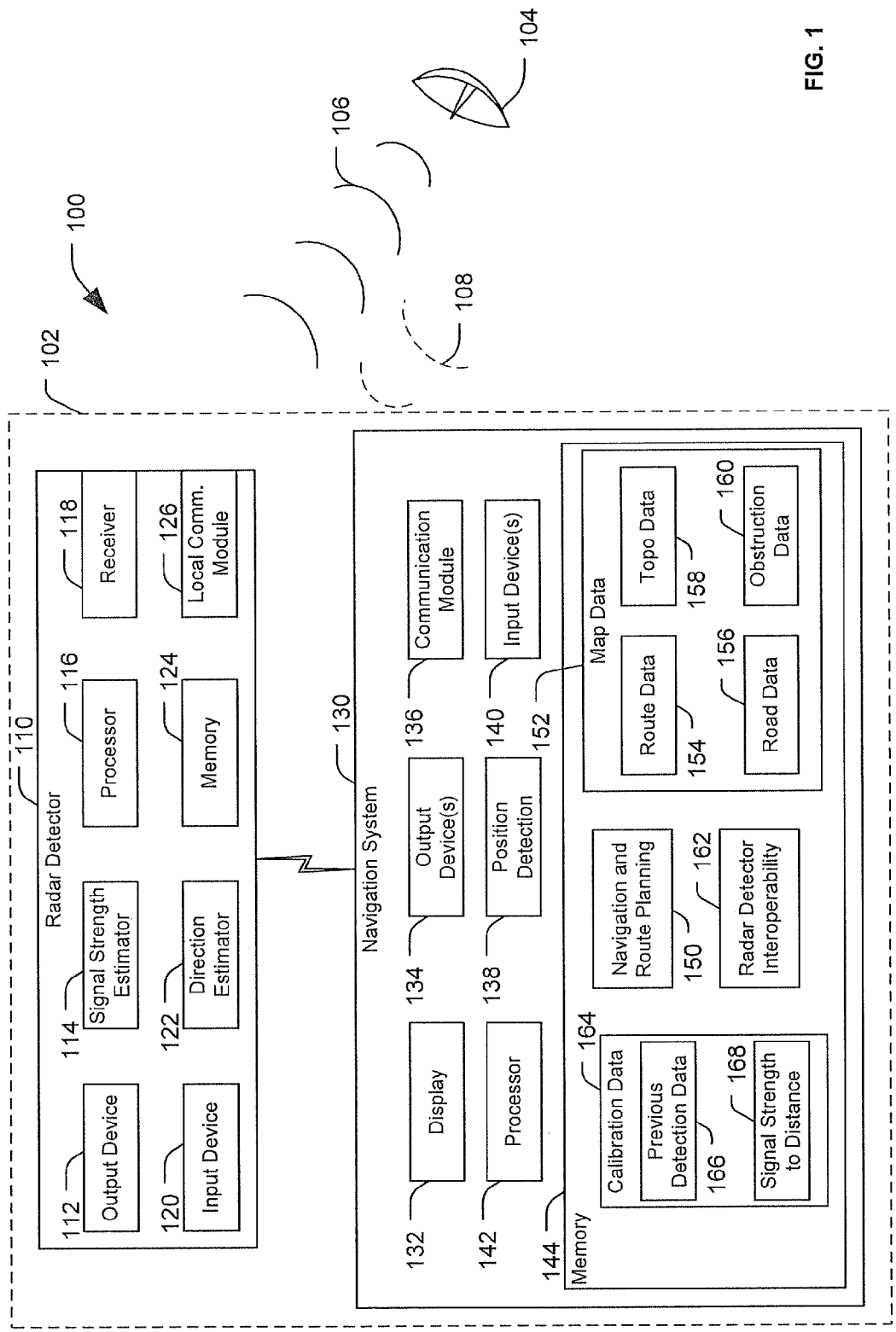
FIG. 1 is a block diagram illustrating a particular embodiment of a system including a radar detector and a navigation system.

FIG. 1 is a block diagram illustrating a particular embodiment of a system 100 including a radar detector 110 and a navigation system 130. The system 100 also illustrates a radar source 104 that is configured to send radar signals 106, to receive reflected radar signals 108 and to estimate a speed of a vehicle 102 based on the reflected radar signals 108.

The radar detector 110 includes a receiver 118 that is configured to detect the radar signals 106. The radar detector 110 may also include a signal strength estimator 114 that generates a signal or data that is indicative of a strength of the radar signal 106. The strength of the radar signal 106 is related to a distance between the radar detector 110 and the source 104 of the radar signal 106. That is, assuming no other factors change, the radar signal 106 will become weaker as the distance between the radar detector 110 and the source 104 increases. Other factors besides distance can also affect the signal strength, such as obstructions (e.g., buildings, topography, etc.). In a particular embodiment, the signal strength estimator 114 includes a circuit that generates the signal or data indicative of the signal strength. In another embodiment, the signal strength estimator 114 includes instructions that are executable by a processor 116 to generate the signal or data indicative of the signal strength. For example, although the signal strength estimator 114 is illustrated as a separate component of the radar detector 110 in FIG. 1, all of or part of the signal strength estimator 114 may be stored as executable instructions in a memory 124 of the radar detector 110. Thus, the signal strength estimator 114 may include hardware, software, or both.

In a particular embodiment, the radar detector 110 includes a direction estimator 122 that generates a signal or data indicative of a direction to the source 104 from the radar detector 110. The direction estimator 122 may determine the direction to the source 104 by receiving the radar signals 106 in a manner that enables estimation of the direction. For example, the radar detector 110 may include a second receiver (not shown). The receiver 118 may be positioned to receive (or to more strongly receive) radar signals from a first direction (e.g., toward a front of the vehicle 102), and the second receiver may be positioned to receive (or to more strongly receive) radar signals from a second direction (e.g., toward a rear of the vehicle 102). Thus, based on which receiver detects the radar signals 106 (or based on which receiver detects the radar signals 106 most strongly), the direction estimator 122 may estimate a direction (e.g., toward the front of the vehicle 102 or toward the rear of the vehicle 102) from the radar detector 110 to the source 104. In another example, the radar detector 110 may include other components, instead of or in addition to the second receiver, to facilitate direction determination, such as a directional antenna or directional antenna array.

In a particular embodiment, the direction estimator 122 includes a circuit that generates a signal or data that is indicative of the direction from the radar detector 110 to the source 104. In another embodiment, the direction estimator 122 includes instructions that are executable by the processor 116 to generate the signal or data indicative of the direction from the radar detector 110 to the source 104. For example, although the direction estimator 122 is illustrated as a separate component of the radar detector 110 in FIG. 1, all of or part of the direction estimator 122 may be stored as executable instructions in a memory 124 of the radar detector 110. Thus, the direction estimator 122 may include hardware, software, or both.

The signal or data that is indicative of the signal strength, the signal or data that is indicative of the direction from the radar detector 110 to the source 104, or both, may be used to generate an output at an output device 112 of the radar detector 110. The output device 112 may be relatively simple, such as a speaker to generate an audible alert or one or more lights to generate a visible alert, or may be more complex, such as a liquid crystal display (LCD) or another video or graphical display. As a specific example, the output device 112 may include a series of lights, and a number of lights that are illuminated may indicate the signal strength with more lights illuminated to indicate greater signal strength. A color of the lights or a particular set of lights illuminated may indicate the direction to the source 104.

The radar detector 110 may also include an input device 120. The input device 120 may include one or more buttons, one or more switches, a touch sensitive screen, another input mechanism, or any combination thereof. The input device 120 may be adapted to receive input from a user to turn on functions of the radar detector 110, to select one or more radar bands to be monitored, to select an output mode of the output device 112, to cause the radar detector to communicate with the navigation system 130, or any combination thereof.

The radar detector 110 may also include a local communication module 126. The local communication module 126 may include a wired interface, a wireless interface, or both, to facilitate communication between the radar detector 110, the navigation system 130, other components within the vehicle 102, or a combination thereof. For example, the local communication module 126 may include a wireless interface that facilitates wireless local communications between the radar detector 110 and the navigation system 130. The wireless communications may utilize any appropriate wireless communication protocol, such as one or more of the wireless communication protocols specified by the Institute for Electrical and Electronic Engineers (IEEE) in 802 standards (e.g., a wireless personal area network or a wireless local area network) or another standards-based or proprietary protocol, such as Bluetooth or ZigBee.

After the radar detector 110 and the navigation system 130 establish communications (e.g., perform a handshake procedure), the radar detector 110 may send information descriptive of detected radar signals to the navigation system 130. For example, the radar detector 110 may send the signal or data that is indicative of the signal strength, the signal or data that is indicative of the direction from the radar detector 110 to the source 104, or both, to the navigation system 130.

The navigation system 130 includes a communication module 136. The communication module 136 may be adapted to communicate with the local communication module 126 of the radar detector 110. The communication module 136 may also be capable of communicating with one or more other devices, such as a mobile telephone, an entertainment system of the vehicle 102, or vehicle control, diagnostic or information computers. The communication module 136 may include one or more wired interfaces, one or more wireless interfaces, or a combination thereof. In a particular embodiment, the communication module 136 may facilitate communication of detection information with other users (e.g., drivers of other vehicles). To illustrate, the communication module 136 may transmit detection data (such as location tagged records of detected radar signals) to other vehicles via a mobile telephony or other wide area wireless network. In another example, the communication module 136 may enable import and/or export of data. To illustrate, the communication module 136 may allow a first user to export detection data (such as location tagged records of detected radar signals or associated statistical information), which may be imported to another navigation system. In a particular embodiment, the detection data may include a tally or count of detected signals and corresponding locations. The detection data may also statistical information derived from such a tally or count, such as a percentage of time that an active radar source is detected in a particular location. The statistical information may be associated with specific times of day, days of the week, days of the month or other time periods.

The navigation system 130 may also include one or more input devices 140, one or more output devices 134, a display 132, or a combination thereof. The input devices 140 may include buttons, knobs, switches, a touch sensitive screen of the display 132, a microphone to receive voice commands, other input mechanisms, or a combination thereof. The output devices 134 may include one or more speakers, one or more lights, other output mechanisms (e.g., an interface to send output signals to other components of the vehicle, such as speakers of a vehicle entertainment system), or a combination thereof. In a particular embodiment, the display 132 may include a touch sensitive screen. In this embodiment, the display 132 may include the output devices 134 and the input devices 140. For example, output may be provided to a user via the display 132, and input may be received from the user via touch interaction with the display 132.

The navigation system 130 may also include a position detection module 138. In a particular embodiment, the position detection module 138 includes a Global Positioning System (GPS) receiver that is capable of receiving satellite signals and determining a position of the vehicle 102 based on the satellite signals. In other embodiments, the position detection module 138 may include other position determination systems, such as an inertial navigation system, a dead-reckoning system, a positioning system that uses signals from a terrestrial network to determine position, another navigation or position determination system, or a combination thereof.

The navigation system 130 may include a processor 142 and memory 144 accessible to the processor 142. The memory 144 may store data, instructions, or both, that are used by the processor 142 to provide functions of the navigation system 130. For example, the memory 144 may include navigation and route planning instructions 150. The navigation and route planning instructions 150 may be executable by the processor 142 to receive position data from the position detection module 138 and to correlate the position data with map data 152 to generate a map display indicating a current location of the vehicle 102. The navigation and route planning instructions 150 may also be executable by the processor 142 to receive a destination input via the input devices 140 and to plan a route from the vehicle's current location (or another location) to the destination. For example, the route may be planned based on route data 154, road data 156, topographical data 158, obstruction data 160, other data (such as traffic data), or a combination thereof. After the route is planned, information describing the route (such as turn-by-turn directions, waypoints, points-of-interest, travel time, travel distance, etc.) may be stored as a data record in the route data 154.

The memory 144 may also include radar detector interoperability instructions 162. The radar detector interoperability instructions 162 may be executable by the processor 142 to enable the navigation system 130 to interact with the radar detector 110. For example, the radar detector interoperability instructions 162 may be executable to receive data, such as the signal strength data, the direction data, other data, or a combination thereof, from the radar detector 110 and to process the received data to generate a graphical user interface at the display 132. The graphical user interface may include a graphical representation associated with the source 104 of the radar signal 106 based on the receive data. For example, the graphical representation may provide a visual cue to the user of an estimated location of or distance to the source 104 of the radar signal 106.

The memory 144 may also store calibration data 164 that is used by the processor 142 to determine the graphical representation. For example, the calibration data 164 may include previous detection data 166 that indicates locations of previously detected radar signals (e.g., a log of historical speed traps generated responsive to calibration operations, described further below, or otherwise). To illustrate, the previous detection data 166 may include a set of data records with each data record corresponding to a previously detected radar signal. Each data record may also be associated with an approximate location of a source of the previously detected radar signal. Accordingly, when data indicating a detected radar signal (i.e., the radar signal 106) is received from the radar detector 110, an estimated location of or distance to a source of the detected radar signal (i.e., the source 104) may be determined. In a particular embodiment, the previous detection data 166 may be maintained as a continuous log in the memory 144 and may be used to determine statistical information (e.g., how often is a radar source located at a particular location). The estimated location of or distance to the source 104 may be compared to the data records in the previous detection data 166 to determine whether the source 104 corresponds to a known source, such as a common location for a speed trap, a speed camera, or a non-speed detection radar source (e.g., an automatic door at a store). The graphical user interface may highlight or otherwise visually indicate locations of sources of previously detected radar signals that correspond to the source 104 of the radar signal 106 based on the data received from the radar detector 110. If the source 104 of the radar signal 106 corresponds to a known non-speed detection radar source, the graphical user interface may indicate that the detected radar signal 106 corresponds to the known non-speed detection radar source (or likely does not correspond to a speed detection radar source). For example, a graphical representation related to the source 104 in the graphical user interface may be color coded or otherwise visually coded (e.g., flashing) to indicate that the detected radar signal 106 corresponds to the known non-speed detection radar source (or likely does not correspond to a speed detection radar source).

The calibration data 164 may include signal strength to distance data 168. The signal strength to distance data 168 may include data that is used by the radar detector interoperability instructions 162 to determine an approximate distance from the radar detector 110 to the source 104 of the radar signal 106 based on the signal strength data received from the radar detector 110. In a particular embodiment, the signal strength to distance data 168 may be predetermined by a manufacturer or supplier of the radar detector 110 and may be communicated from the radar detector 110 to the navigation system 130. In another particular embodiment, the signal strength to distance data 168 may be provided by the user via the input devices 140 based on data associated with the radar detector 110, such as user manuals or testing data made available by the manufacturer or the supplier of the radar detector 110. In yet another particular embodiment, the signal strength to distance data 168 may be determined by the navigation system 130 based on a calibration process. A particular example of a calibration process is described with reference to FIGS. 11 and 12. In other embodiments, the signal strength to distance data 168 may be provided from more than one data source. For example, signal strength to distance data values for a K band may be provided via the input devices 140 and signal strength to distance data values for a Ka band may be determined via the calibration process. In another example, initial signal strength to distance data values may be provided via the input devices 140 and updated signal strength to distance data values may be determined via the calibration process.

In a particular embodiment, the graphical representation may also be based on data stored at the memory 144, such as the route data 154, the road data 156, the topographical data 158 and the obstruction data 160. For example, when determining an estimated location of the source 104, the radar detector interoperability instructions 162 may eliminate from consideration locations that are not feasible or not likely to be the location of the source 104 based on the road data 156, the topographical data 158, the obstruction data 160, or a combination thereof. To illustrate, when the location of the source is approximately one mile from the vehicle (based on the signal strength data), the radar detector interoperability instructions 162 may determine that the source is unlikely to be to the left of the vehicle because of topographic constraints (e.g., a large change in elevation lies to the left of the vehicle within one mile), because of road constraints (e.g., there are no roads to the left of the vehicle within one mile), because of obstruction constraints (e.g., there is a large building complex to the left of the vehicle), or a combination thereof. As another example, the radar detector interoperability instructions 162 may eliminate from consideration locations that are not along a current route, as indicated by the route data 154. For example, the user may be notified that a speed detection radar is in use down a road to the left of the vehicle if the particular road is along a planned travel route indicated by the route data 154 and may not be notified of the speed detection radar if the particular road is not along the planned travel route.

In operation, the navigation system 130 and the radar detector 110 may perform a handshake operation to activate interoperability of the radar detector 110 and the navigation system 130. The navigation system 130 may be calibrated, e.g., by a manufacturer or distributer or by a user (as further described with reference to FIGS. 11 and 12, to estimate a distance to a source of a radar signal (such as the radar signals 106) based on signal strength data provided by the radar detector 110. As the vehicle 102 is moving, the navigation system 130 may determine the location of the vehicle 102 (e.g., based on GPS data) and may generate a display that graphically represents the location of the vehicle 102. For example, a graphical representation of the vehicle 102 may be placed in a map display at a location corresponding to the location of the vehicle 102. When the user has programmed a planned route, the display may also include information indicating the planned route.

When the radar detector 110 detects the radar signals 106 from the source 104, the signal strength estimator 114 may determine a signal strength of the received radar signals 106. The local communication module 126 may send signal strength data indicating the determined signal strength to the navigation system 130. If the radar detector 110 is capable of determining direction information, the direction estimator 122 of the radar detector 110 may determine a direction to the source 104, and the local communication module 126 may send direction data indicating the determined direction to the navigation system 130.

The navigation system 130 may determine an approximate distance from the vehicle 102 to the source 104, for example, based on the signal strength data and the calibration data 164. The navigation system 130 may update the display to include a graphical representation related to the source 104. The graphical representation related to the source 104 may be displayed in a manner that indicates the approximate distance to the source 104. The display may also indicate other information that is useful to the user. For example, when the radar detector 110 provides the direction data, the navigation system 130 may display the graphical representation related to the source 104 in a manner that indicates the direction to the source 104. The display may also, or in the alternative, indicate the direction to the source 104 based on other information, such as the topographical data 158, the road data 156, or the obstruction data 160. Examples of displays and information graphically represented in the displays are described further with reference to FIGS. 2-6.

Accordingly, the system 100 enables graphical representation of information about a detected radar signal, such as the radar signals 106. In a particular embodiment, the system 100 uses a navigation system that is separated from but interacts with a radar detector. In this embodiment, since the navigation system and the radar detector are distinct components, users are able to "mix-and-match" components according to desired characteristics (such as whether the radar detector is able to detect particular bands or is able to detect direction information). Navigation systems are becoming increasingly common in modern vehicles, and many such navigation system include the ability to communicate with other devices in a vehicle (e.g., via Bluetooth). Thus, providing functionality of the system 100 can be implemented at relatively low cost since processing performed by the navigation system 130 can be provided via software updates (e.g., to enable the navigation system 130 to execute the radar detector interoperability instructions 162).

Figure 2:
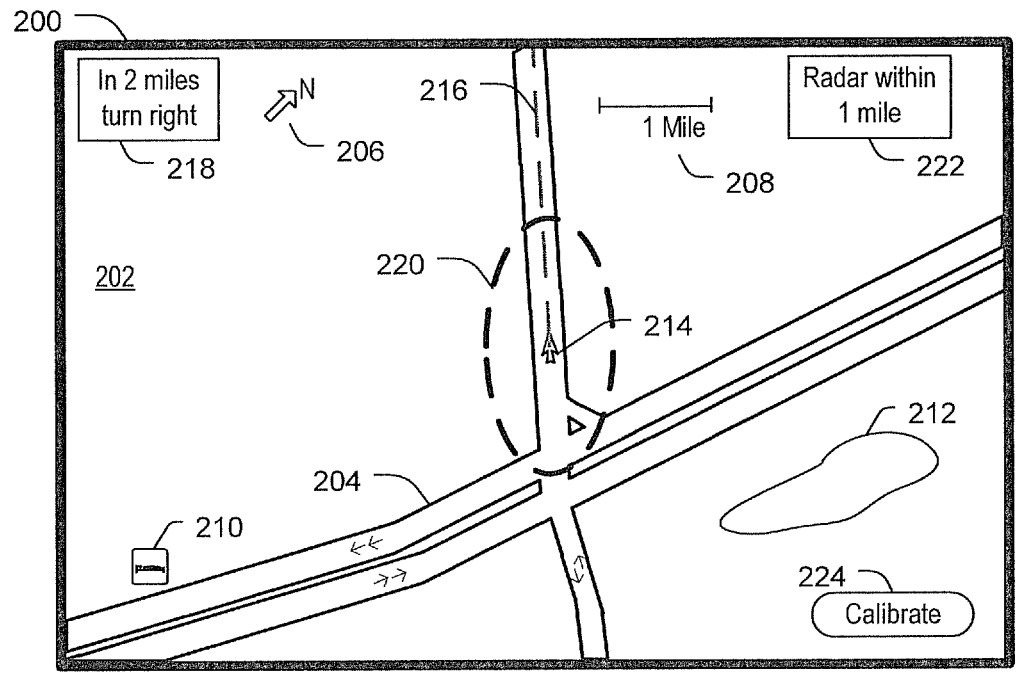
FIG. 2 is an illustration of a first particular embodiment of a navigation system display including information about a detected radar signal.

FIG. 2 is an illustration of a first particular embodiment of a navigation system display 200 including information about a detected radar signal. The display 200 may be generated by a navigation system, such as the navigation system 130 of FIG. 1. The display 200 may present information about a current location of a vehicle, such as the vehicle 102, to a user, such as a driver of the vehicle. For example, the display 200 may include a graphical representation of map data 202. The graphical representation of the map data 202 may include information about roadways 204, cardinal directions 206 (e.g., North, South, East and West), distances (e.g., a map scale 208), symbols representing points of interest 210 (e.g., gas stations, lodging, stores, etc.), symbols representing geographic features 212 (e.g., lakes), other information, or a combination thereof. In a particular embodiment, a graphical representation of the vehicle 214 may be shown in the display 200 in a manner that indicates a location of the vehicle relative to other locations depicted in the display 200. For example, as shown in FIG. 2, the graphical representation of the vehicle 214 indicates that the vehicle is on a road that is roughly northwest of an intersection with a larger road or highway.

The display 200 may also, or in the alternative, include information about a planned route 216. For example, when the user provides input to the navigation system indicating a destination, the navigation system may prepare a planned route that may be followed to reach the destination. The planned route 216 may be depicted in the display 200 in a manner that helps the user navigate along the planned route 216. To illustrate, the planned route 216 may be depicted by highlighting or color coding a portion of a roadway of the map data 202. The planned route 216 may also be used to determine navigation prompts 218 that are depicted in the display 200, output audibly to the driver, or both.

In a particular embodiment, the navigation system may be operable to receive information about a detected radar signal from a radar detector and to include information about the detected radar signal in the display 200. For example, the navigation system may receive signal strength data, radar band data, direction, other information, or a combination thereof, from the radar detector. Since signal strength of the radar signal is related to distance from the radar detector to a source of the radar signal, the navigation system may use the signal strength data to estimate a distance from the vehicle to the source of the radar signal. The navigation system may provide information about the estimated distance to the source of the radar signal in the display 200. For example, the navigation system may depict a graphical representation related to the source of the radar signal as a closed geometric shape 220 (which is illustrated using a dashed line merely to distinguish the graphical representation of the source from terrain and other features and not to indicate breaks or discontinuities). When the display 200 includes the graphical representation of the vehicle 214, the closed geometric shape 220 may enclose or surround the graphical representation of the vehicle 214.

In particular embodiments, a shape of the closed geometric shape 220 may be selected to indicate an expected direction from the vehicle to the source of the radar signal. For example, in FIG. 2, the closed geometric shape 220 is an oval having a major axis along the roadway and a minor axis across the roadway. Since radar sources associated with monitoring speed of vehicles are expected to be along a roadway, the closed geometric shape 220 may be depicted as an oval or another elongated geometric shape to indicate that the source of the radar signal is either in front of or behind the vehicle (as opposed to in a non-roadway area to the left or right of the vehicle). In a particular embodiment, the closed geometric shape 220 may be displayed in response to a detected radar signal only when the vehicle is determined to be exceeding a posted speed limit.

In particular embodiments, a size of the closed geometric shape 220 may be selected to indicate the estimated distance from the vehicle to the source of the radar signal. For example, in FIG. 2, the closed geometric shape 220 is an oval having a major axis along the roadway and a minor axis across the roadway. According to the map scale 208, the length of the major axis corresponds to approximately one mile. Thus, in this example, the display 200 indicates that the source of the radar signal is estimated to be approximately one mile from the vehicle. In some embodiments, the display 200 also includes a textual representation 222 of the estimated distance to the source of the radar signal.

In particular embodiments, a color, intensity or other visual parameter of the closed geometric shape 220 may be selected to indicate the estimated distance from the vehicle to the source of the radar signal, or to indicate other information, such as a likelihood that the source of the radar signal is locked on to or directed toward the vehicle (e.g., that a police officer operating the source of the radar signal is attempting to monitor the speed of the vehicle). For example, when the radar signal is detected but the signal strength of the radar signal is so weak as to indicate that the source of the radar signal is not directed at the vehicle (e.g., the signal strength is below a threshold value), the closed geometric shape 220 may be displayed using a first set of visual parameters, such as a first color, a first intensity, steady or flashing, etc. However, when the radar signal is detected and the signal strength of the radar signal is strong enough that the source of the radar signal may be directed at the vehicle (e.g., the signal strength is at or above the threshold value), the closed geometric shape 220 may be displayed using a second set of visual parameters, such as a different color, a different intensity, a different pattern of steady or flashing, etc. To illustrate, when the radar signal is initially detected, the source of the radar signal may be relatively far from the vehicle. In this case, the closed geometric shape 220 may be large (indicating the distance to the source) and may include a steady (i.e., not flashing) yellow line (indicating a low likelihood that the source of the radar signal is monitoring the speed of the vehicle). As the vehicle continues along the roadway, the vehicle may draw closer to the source of the radar signal and the display 200 may be updated such that the closed geometric shape 220 is smaller (indicating that the vehicle is closer to the source) and may change color and/or begin flashing (indicating an increased likelihood that the source of the radar signal is monitoring the speed of the vehicle). When the signal strength is large enough (e.g., above a threshold) to indicate that the source of the radar signal may be monitoring the speed of the vehicle (e.g., "locked on" to the vehicle), the closed geometric shape 220 may be still smaller (indicating that the vehicle is even closer to the source) and may flash red (indicating a high likelihood that the source of the radar signal is monitoring the speed of the vehicle).

Thus, the user may be provided with easily understandable graphical cues related to detected radar signals based on interaction between a navigation system and a radar detector. Since the navigation system and the radar detector may be separate components or devices within the vehicle, the navigation system may be calibrated to enable the navigation system to estimate distances that correspond to signal strengths detected by the radar detector. Accordingly, the display 200 may include a user-selectable option 224 to calibrate the navigation system when a radar signal is detected. Calibration of the navigation system is described in more detail with reference to FIGS. 11 and 12.

Figure 3:
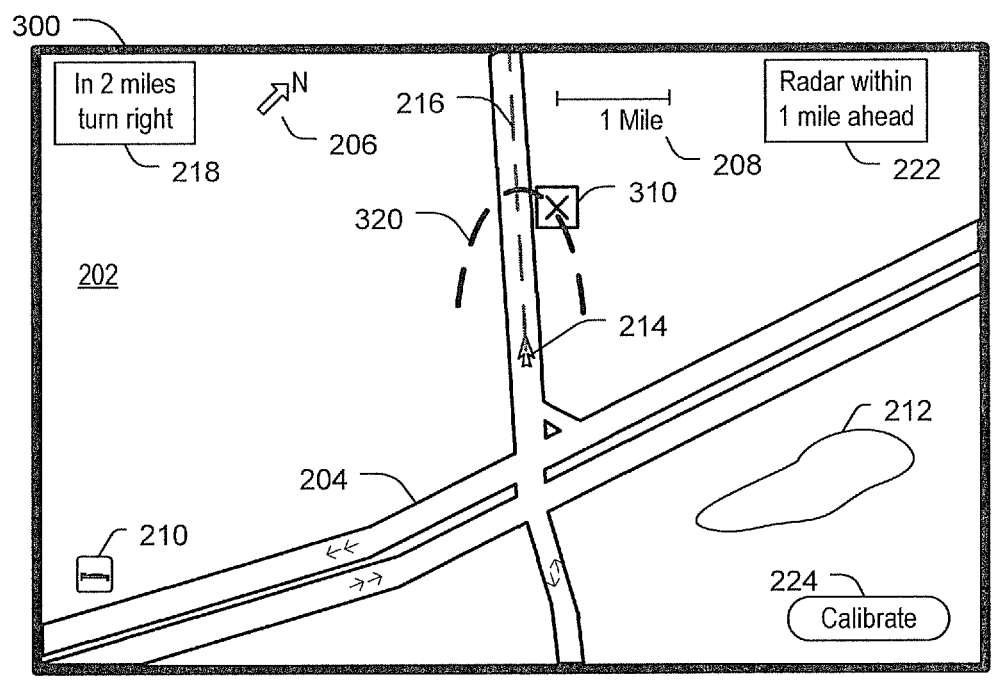
FIG. 3 is an illustration of a second particular embodiment of a navigation system display including information about a detected radar signal.

FIG. 3 is an illustration of a second particular embodiment of a navigation system display 300 including information about a detected radar signal. The display 300 may be generated by a navigation system, such as the navigation system 130 of FIG. 1. The display 300 may present information about a current location of a vehicle, such as the vehicle 102, to a user, such as a driver of the vehicle 102. For example, the display 300 may include a graphical representation of the map data 202 described with reference to FIG. 2. The display 300 may also, or in the alternative, include information about the planned route 216, the navigation prompts 218, or both.

As described with reference to FIG. 2, the navigation system may be operable to receive information about a detected radar signal from a radar detector and to include information about the detected radar signal in the display 300. For example, the navigation system may receive signal strength data from the radar detector and may use the signal strength data to estimate a distance from the vehicle to a source of a radar signal. The navigation system may provide information about the estimated distance to the source of the radar signal in the display 300. The navigation system may also determine information about a direction to the source of the radar signal from the vehicle. For example, the direction may be determined based on information received from the radar detector (e.g., direction data). In another example, the direction may be determined based on other information available to the navigation system, such as information describing the planned route 216. To illustrate, since the user may only be concerned about radar sources that may be used to track the speed of the vehicle, the user may not be concerned about relatively distant radar sources that are not along the planned route 216 ahead of the vehicle.

Whether the direction is determined based on direction data received from the radar detector or is determined based on the other information available to the navigation system, the navigation system may depict a graphical representation related to the source of the radar signal as an open geometric shape 320. The open geometric shape 320 may be displayed in a manner that indicates the estimated distance and direction to the source. For example, the open geometric shape 320 may be displayed in front of, behind, beside or otherwise around the graphical representation of the vehicle 214. To illustrate, the open geometric shape 320 may indicate up to about 180 degrees around the vehicle as a possible location of the source of the radar signal. A distance of the open geometric shape 320 from the graphical representation of the vehicle 214 in the display 300 may correspond to the estimated distance from the source of the radar signal to the vehicle based on the map scale 208. Additionally, or in the alternative, a set of visual parameters (e.g., color, intensity, steady or flashing) used to display the open geometric shape 320 may be selected to indicate the estimated distance, the direction, a likelihood that the radar signal is being used to monitor speed of the vehicle, or a combination thereof.

In a particular embodiment, historical information that is available to the navigation system (such as the previous detection data 116 of FIG. 1) may be used to determine a probable location of the source of the radar signal. When a probable location of the source of the radar signal can be determined, the probable location may be indicated in the display 300. For example, a source symbol 310 may be included in the display 300 to denote one or more likely locations of the source of the radar signal (e.g., locations that have a probability of being a location of the source that is greater than a threshold).

Figure 4:
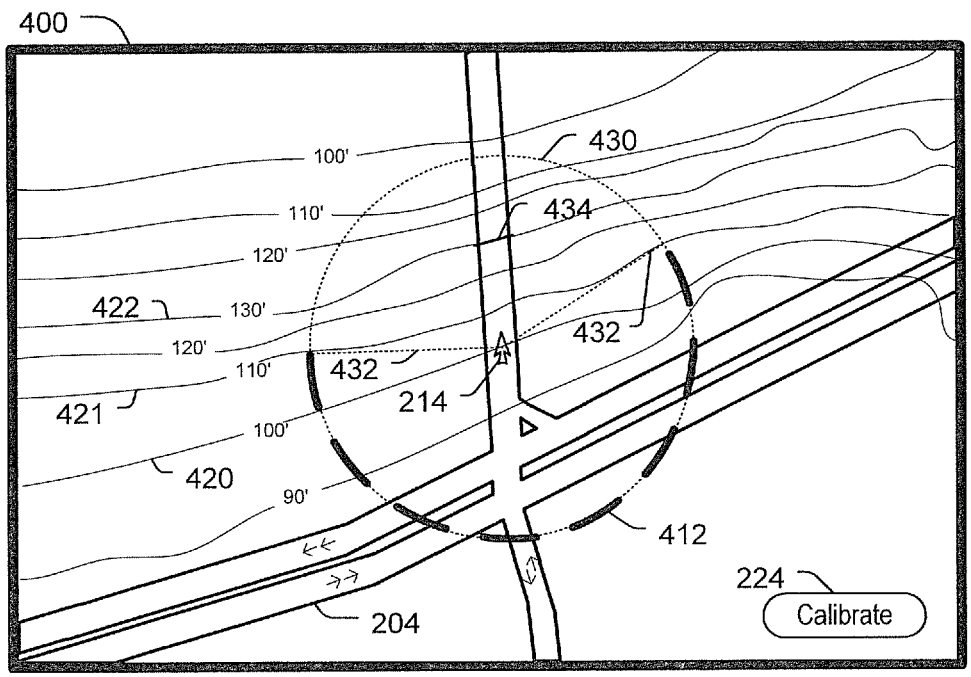
FIG. 4 is an illustration of a third particular embodiment of a navigation system display including information about a detected radar signal.

FIG. 4 is an illustration of a third particular embodiment of a navigation system display 400 including information about a detected radar signal. The display 400 may be generated by a navigation system, such as the navigation system 130 of FIG. 1. The display 400 may present information about a current location of a vehicle, such as the vehicle 102, to a user, such as a driver of the vehicle 102. For example, the display 400 may include a graphical representation of the map data 202 described with reference to FIG. 2. The display 400 may also, or in the alternative, include information about the planned route 216, the navigation prompts 218, or both.

As described with reference to FIG. 2, the navigation system may be operable to receive information about a detected radar signal from a radar detector and to include information about the detected radar signal in the display 400. For example, the navigation system may receive signal strength data from the radar detector and may use the signal strength data to estimate a distance from the vehicle to a source of a radar signal. The navigation system may provide information about the estimated distance to the source of the radar signal in the display 400. The navigation system may also determine information about a direction to the source of the radar signal from the vehicle. For example, the direction may be determined based on information received from the radar detector (e.g., direction data), based on information descriptive of a planned route, based on other information available to the navigation system, or a combination thereof.

FIG. 4 illustrates an embodiment in which the direction information is determined based at least in part on topographical information, such as the topographical data 158 of FIG. 1. The topographical information is illustrated in the display 400 as a set of elevation lines 420-422, where each elevation line corresponds to a particular elevation of local topography. For example, a first elevation line 420 indicates an elevation of 100 feet (e.g., 100 feet above sea level or relative to some other reference elevation), a second elevation line 421 indicates an elevation of 110 feet, and a third elevation line 422 indicates an elevation of 130 feet. Thus, the display 400 indicates that the vehicle is going uphill (from a current elevation of 100 feet toward a higher elevation of at least 130 feet). The third elevation line 422 may correspond to a peak elevation of the hill since after the third elevation line 422, other elevation lines indicate lower elevations than 130 feet.

In a particular embodiment, the navigation system is operable to receive information about a detected radar signal from a radar detector and to include information about the detected radar signal in the display 400. For example, the navigation system may receive signal strength data from the radar detector. Since signal strength of the radar signal is related to distance from the radar detector to a source of the radar signal, the navigation system may use the signal strength data to estimate a distance from the vehicle to the source of the radar signal. In FIG. 4, the estimated distance is illustrated as a circle 430 surrounding the graphical representation of the vehicle 214 at a scaled distance that corresponds to the estimated distance.

The navigation system may also use information available to the navigation system, such as the topographical data, to determine (e.g., using artificial intelligence, other heuristics, or other executable instructions) a probable direction from the vehicle to the source of the detected radar signal. For example, as described above, the topographical data indicates that the vehicle is on a hill with a peak at or near the third elevation line 422. The estimated distance to the source of the radar signal extends past the peak of the hill (as indicated in FIG. 4 by the circle 430 extending beyond the third elevation line 422). The navigation system may determine that the source of the detected radar signal is unlikely to be beyond the peak of the hill, and may accordingly generate a graphical representation related to the source 412 that does not extend beyond the peak of the hill. In a particular embodiment, a threshold elevation change may be used to determine the likely direction to the source. For example, the threshold elevation change may be set such that a peak (e.g., an elevation increase followed by an elevation decrease) that is at ten feet higher than an elevation of the vehicle is used to generate the display 400. In this example, since the vehicle is approximately at an elevation of 100 feet (corresponding to the first elevation line 420), the navigation system may determine an arch (denoted in FIG. 4 by radii 432) of the circle 430 corresponds to an elevation of less than 110 feet (i.e., 100 feet plus 10 feet). The arch of the circle 430 may be displayed as a graphical representation related to the source 412 to indicate an estimated distance and likely direction to the source.

In another particular embodiment, the navigation system may use the topographical data to identify that a potential obstruction between the vehicle and the source of the radar signal. For example, the navigation system may determine that, if the source is beyond the peak of the hill, the hill may act as an obstruction between the source and the vehicle. That is, the vehicle may become visible to the source at approximately the peak. Accordingly, the display 400 may include an indicator 434 to highlight the potential obstruction. The indicator 434 may correspond to a location at which the vehicle may become visible to the source. To illustrate, in the example of FIG. 4, the peak corresponds approximately to the third elevation line 422. Accordingly, the indicator 434 may include a line or other indicator shown in the display at a location that corresponds to the peak.

While topographical information has been shown in the display 400 of FIG. 4, in certain embodiments, the topographical data may be used by the navigation system to display information related to a detected radar signal without displaying the topographical data itself. For example, the elevation lines 420-422 may not be displayed in the display 400 but may nonetheless be used to determine a probable location of the source in order to generate the graphical representation related to the source 412, may be used to display the indicator 434 highlighting a potential obstruction, or both. Further, the circle 430, the radii 432, or both, may be shown in the display 400 or may be omitted from the display 400.

Figure 5:
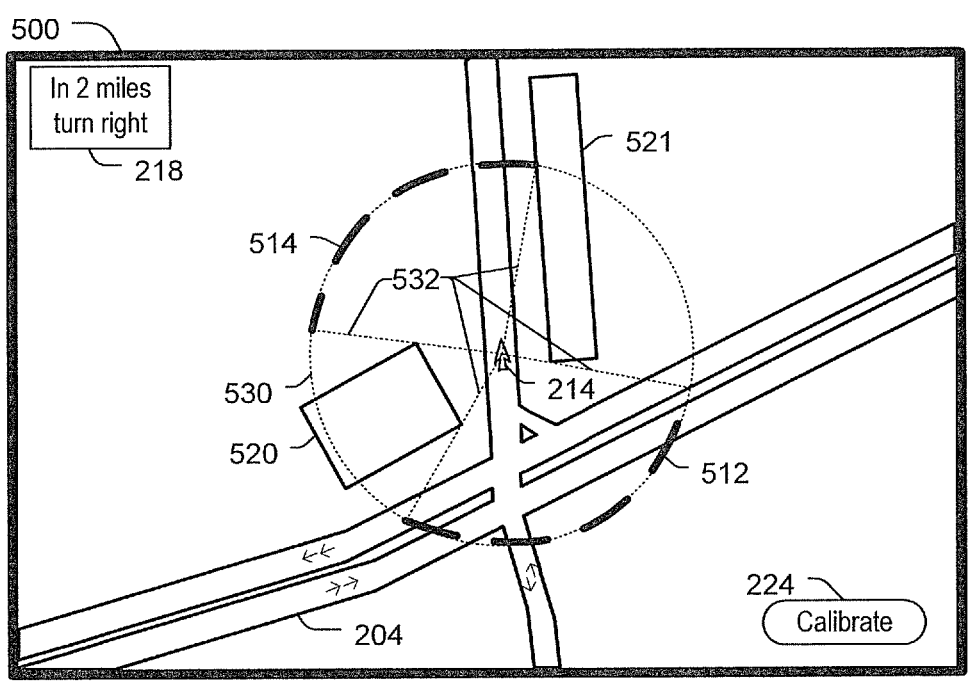
FIG. 5 is an illustration of a fourth particular embodiment of a navigation system display including information about a detected radar signal.

FIG. 5 is an illustration of a fourth particular embodiment of a navigation system display 500 including information about a detected radar signal. The display 500 may be generated in a manner that is similar to generation of the display 400 of FIG. 4. For example, while the display 400 of FIG. 4 illustrates displaying the graphical representation related to the source 412 in a manner that indicates a potential obstruction related to topography, the display 500 of FIG. 5 illustrates displaying a graphical representation related to a source 512 and 514 in a manner that indicates a potential obstruction related to a structure or structures, such as a first structure 520 and a second structure 521.

In the embodiment of FIG. 5, data indicating an approximate size, shape and location of each of the structures 520 and 521 may be available to the navigation system. For example, the obstruction data 160 of FIG. 1, may include information about particular structures (e.g., large structures). When the navigation system receives signal strength data from the radar detector, the navigation system may determine an estimated distance (illustrated in FIG. 5 as a circle 530) from the vehicle to the source of the detected radar signal. The navigation system may determine portions of the circle 530 that do not correspond to probable locations of the source. For example, the portions of the circle 530 that do not correspond to probable locations of the source locations may include portions of the circle 530 that do not have a direct line of sight to the vehicle. In FIG. 5, radii 532 are used to illustrate lines of sight to the vehicle that are obscured by the structures 520, 521. The navigation system may generate a graphical representation related to the source 512, 514 that indicates the estimated distance to the source and a probable location of the source.

While the structures 520, 521 are shown in the display 500 of FIG. 5, in certain embodiments, the data descriptive of the structures 520, 521 may be used by the navigation system to display information related to a detected radar signal without displaying the structures 520, 521 themselves. For example, the data descriptive of the structures may be used to determine the probable locations of the source in order to generate the graphical representation related to the sources 512, 514 without displaying the structures 520, 521. Further, the circle 530, the radii 532, or both, may be shown in the display 500 or may be omitted from the display 500.

Figure 6:
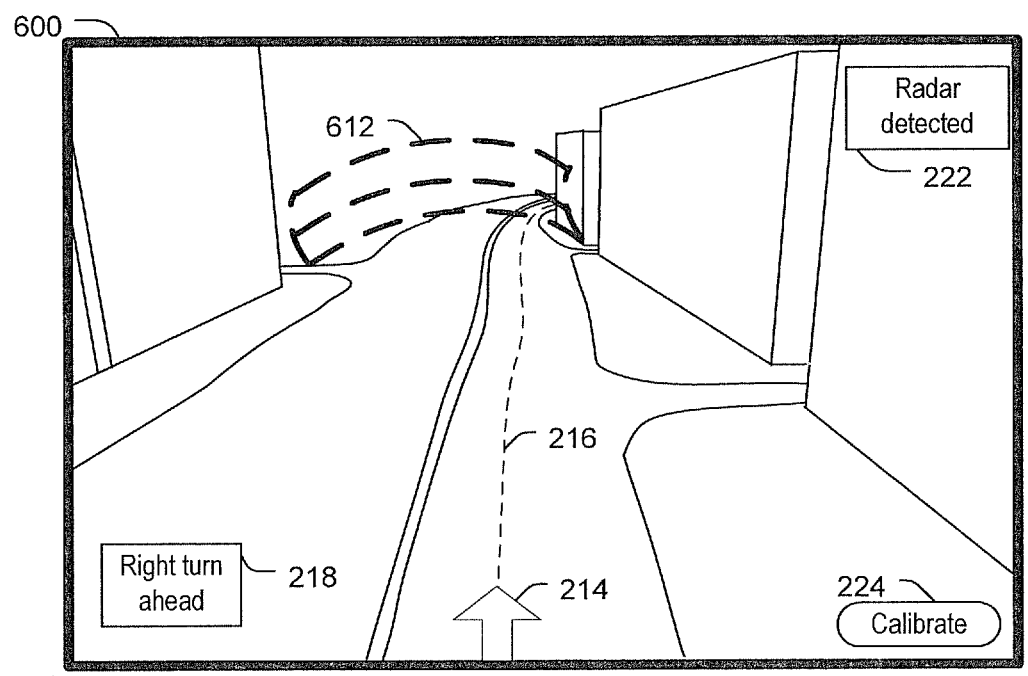
FIG. 6 is an illustration of a fifth particular embodiment of a navigation system display including information about a detected radar signal.

The displays 200-500 of FIGS. 2-5 show map data from a top view. FIG. 6 is an illustration of a fifth particular embodiment of a navigation system display 600 that includes information about a detected radar signal and that shows the map data from a user point of view. The display 600 may be generated in the same manner as any of the displays 200-500 except that rather than presenting the map data and a graphical representation related to the source in the top view, the map data and a graphical representation related to the source 612 are presented in a perspective view. The displays 200-600 have been described separately to simplify the description of determining particular information for display. In particular embodiments, two or more of the displays 200-600 or methods used to generate the two or more of the displays 200-600 may be combined to generate a single display. For example, direction data may be received from a radar detector (as described with reference to FIG. 3) and the direction data may be used in conjunction with obstruction data (as described with reference to FIG. 5), topographical data (as described with reference to FIG. 4), or both, to determine a probable location of the source.

Additionally, some of the displays 200-600 have been described in a manner that includes two or more features that may be used independently or in conjunction with other features with which they are not specifically illustrated. For example, the display 300 of FIG. 3 includes the source symbol 310 to denote a likely location of the source. In a particular embodiment, the source symbol 310 may be displayed without another graphical representation related to the source. In another particular embodiment, the source symbol 310 may be displayed along with a graphical representation related to the source that is determined based on other data than data used to generate the display 300, such as topographical data, obstruction data, or both.

Figure 7:
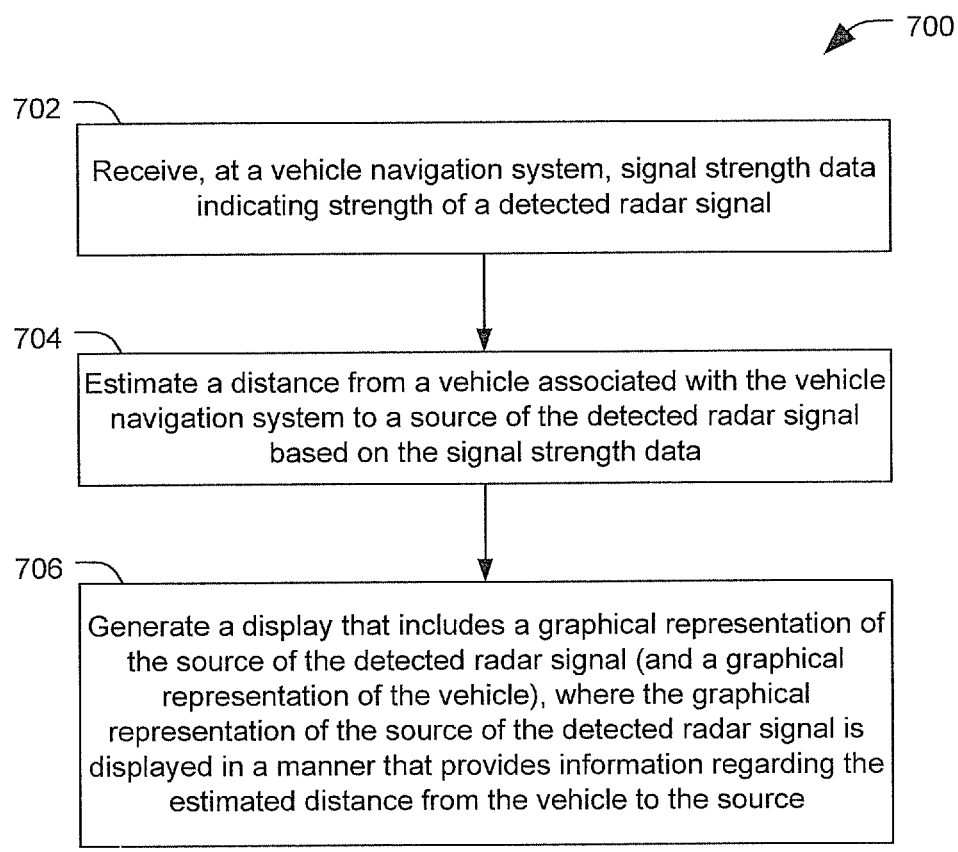
FIG. 7 is a flow chart of a first particular embodiment of a method of displaying information about a detected radar signal.

FIG. 7 is a flow chart of a first particular embodiment of a method 700 of displaying information about a detected radar signal. The method 700 may be performed by a navigation system of a vehicle, such as the navigation system 130 of FIG. 1, operating in conjunction with a radar detector, such as the radar detector 110 of FIG. 1.

The method 700 includes, at 702, receiving signal strength data indicating strength of a detected radar signal. For example, the signal strength data may be received by the navigation system 130 of FIG. 1 from the radar detector 110. The method 700 also includes, at 704, estimating a distance from a vehicle associated with the vehicle navigation system to a source of the detected radar signal based on the signal strength data. For example, the navigation system 130 may estimate the distance to the source 104 based on the signal strength data and the calibration data 164.

The method 700 may also include, at 706, generating a display that includes a graphical representation related to the source (and possibly a graphical representation of the vehicle). For example, the graphical representation related to the source may include an open geometric shape (such as an arc or line) or a closed geometric shape (such as a circle or ellipse) around the graphical representation of the vehicle. Various graphical representations of the vehicle and the source are described with reference to FIGS. 2-6. The graphical representation related to the source may be displayed in a manner that provides information regarding the estimated distance from the vehicle to the source. For example, the graphical representation related to the source may be color coded to indicate the distance. In another example, a size of the graphical representation related to the source in the display may indicate the distance. In another example, another display characteristic (such as a flashing or steady image) or combination of display characteristics (e.g., a color and a size) may be used to indicate the distance.

Accordingly, the method 700 may enable the vehicle navigation system to interact with a radar detector to present information about a detected radar signal. The vehicle navigation system may present the information about the detected radar signal using easily understandable visual cues. Thus, a user (e.g., a driver of the vehicle) may be able to quickly evaluate the information presented with little distraction, e.g. from driving.

Figure 8:
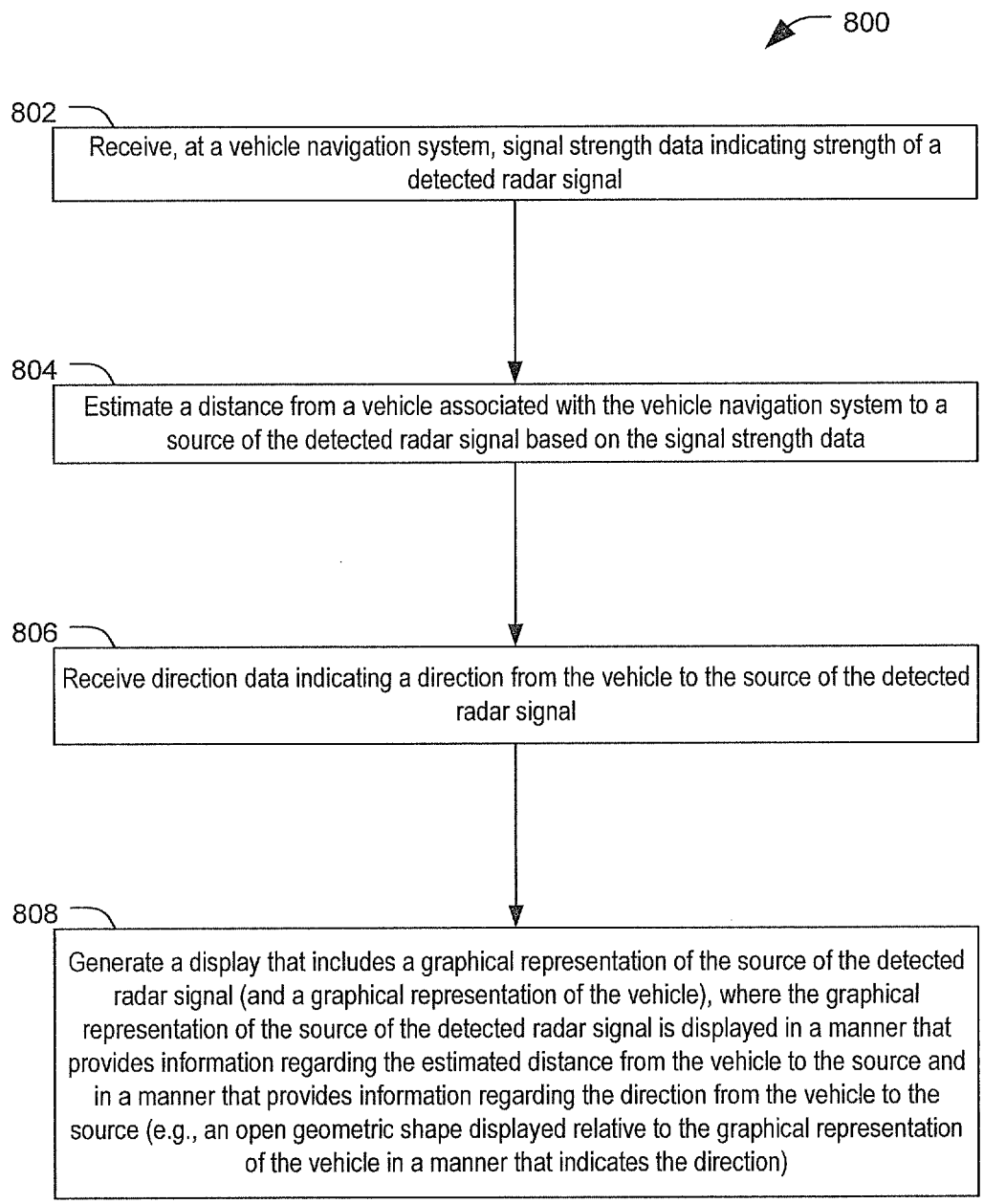
FIG. 8 is a flow chart of a second particular embodiment of a method of displaying information about a detected radar signal.

FIG. 8 is a flow chart of a second particular embodiment of a method of displaying information about a detected radar signal. The method 800 may be performed by a navigation system of a vehicle, such as the navigation system 130 of FIG. 1, operating in conjunction with a radar detector, such as the radar detector 110 of FIG. 1.

The method 800 includes, at 802, receiving (e.g., at a vehicle navigation system) signal strength data indicating strength of a detected radar signal. For example, the signal strength data may be received by the navigation system 130 of FIG. 1 from the radar detector 110. The method 800 also includes, at 804, estimating a distance from a vehicle associated with the vehicle navigation system to a source of the detected radar signal based on the signal strength data. For example, the navigation system 130 may estimate the distance to the source 104 based on the signal strength data and the calibration data 164.

The method 800 may also include, at 806, receiving direction data indicating a direction from the vehicle to the source of the detected radar signal. For example, the direction data may be received by the navigation system 130 of FIG. 1 from the radar detector 110.

The method 800 may also include, at 808, generating a display that includes a graphical representation related to the source (and possibly a graphical representation of the vehicle). For example, the graphical representation related to the source may include an open geometric shape (such as an arc or line) or a closed geometric shape (such as a circle or ellipse) around the graphical representation of the vehicle. Various graphical representations of the vehicle and the source are described with reference to FIGS. 2-6. The graphical representation related to the source may be displayed in a manner that provides information regarding the estimated distance from the vehicle to the source and that provides information regarding the direction from the vehicle to the source. For example, the graphical representation related to the source may include an open geometric shape displayed relative to the graphical representation of the vehicle in a manner that indicates the direction, as described with reference to FIG. 3. In another example, a particular combination of display characteristic, such as color, shape, size, orientation, icons, flashing or steady graphics, etc., may be used to indicate the distance and the direction.

Accordingly, the method 800 may enable the vehicle navigation system to interact with a radar detector to present information about a detected radar signal. The vehicle navigation system may present the information about the detected radar signal using easily understandable visual cues. Thus, a user (e.g., a driver of the vehicle) may be able to quickly evaluate the information presented with little distraction, e.g. from driving.

Figure 9:
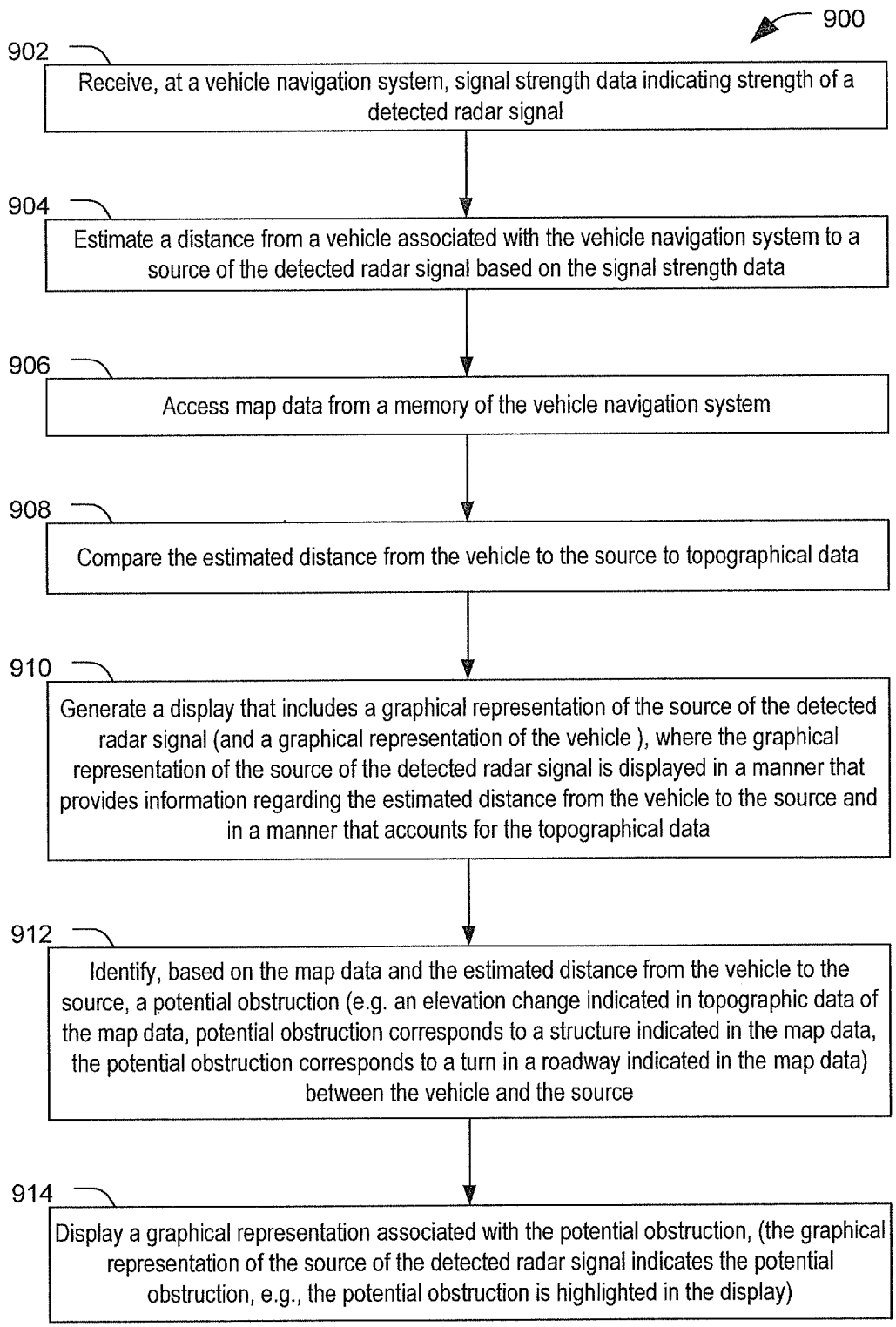
FIG. 9 is a flow chart of a third particular embodiment of a method of displaying information about a detected radar signal.

FIG. 9 is a flow chart of a third particular embodiment of a method of displaying information about a detected radar signal. The method 900 may be performed by a navigation system of a vehicle, such as the navigation system 130 of FIG. 1, operating in conjunction with a radar detector, such as the radar detector 110 of FIG. 1.

The method 900 includes, at 902, receiving signal strength data indicating strength of a detected radar signal. For example, the signal strength data may be received by the navigation system 130 of FIG. 1 from the radar detector 110. The method 900 also includes, at 904, estimating a distance from a vehicle associated with the vehicle navigation system to a source of the detected radar signal based on the signal strength data. For example, the navigation system 130 may estimate the distance to the source 104 based on the signal strength data and the calibration data 164.

The method 900 may also include, at 906, accessing map data from a memory of the vehicle navigation system. For example, the processor 142 of the navigation system 130 of FIG. 1 may access the map data 152 from the memory 144. The map data may include route data, road data, topographical data, obstruction data, other data regarding a particular geographic region or points-of-interest associated with the particular geographic region, or a combination thereof.

In a particular embodiment, the method 900 includes, at 908, comparing the estimated distance from the vehicle to the source to topographical data of the map data. In this embodiment, the method 900 may also include generating a display that includes a graphical representation related to the source (and possibly a graphical representation of the vehicle), at 910. The graphical representation related to the source of the detected radar signal is displayed in a manner that accounts for the topographical data. For example, a shape of other display characteristic of the graphical representation related to the source may be selected to account for the topographical data. To illustrate, a shape of the graphical representation related to the source may be selected to indicate to a user that the source is not in a particular direction. An example of a graphical representation related to a source that accounts for topographical data is described with reference to FIG. 4.

Alternately or in addition, in a particular embodiment, the method 900 includes, at 912, identifying, based on the map data and the estimated distance from the vehicle to the source, a potential obstruction between the vehicle and the source. Examples of potential obstructions may include, but are not limited to, an elevation change indicated in topographic data of the map data, a structure indicated in the map data, or a turn in a roadway indicated in the map data. When a potential obstruction is identified, the method 900 may include, at 914, displaying a graphical representation associated with the potential obstruction. For example, the graphical representation related to the source of the detected radar signal may be selected to indicate the potential obstruction. In another example, the potential obstruction may be highlighted in the display.

Accordingly, the method 900 may enable the vehicle navigation system to interact with a radar detector to present information about a detected radar signal and to relate the information about the detected radar signal to map data available to the vehicle navigation system. The vehicle navigation system may present the information about the detected radar signal using easily understandable visual cues. Thus, a user (e.g., a driver of the vehicle) may be able to quickly evaluate the information presented with little distraction, e.g. from driving.

Figure 10:
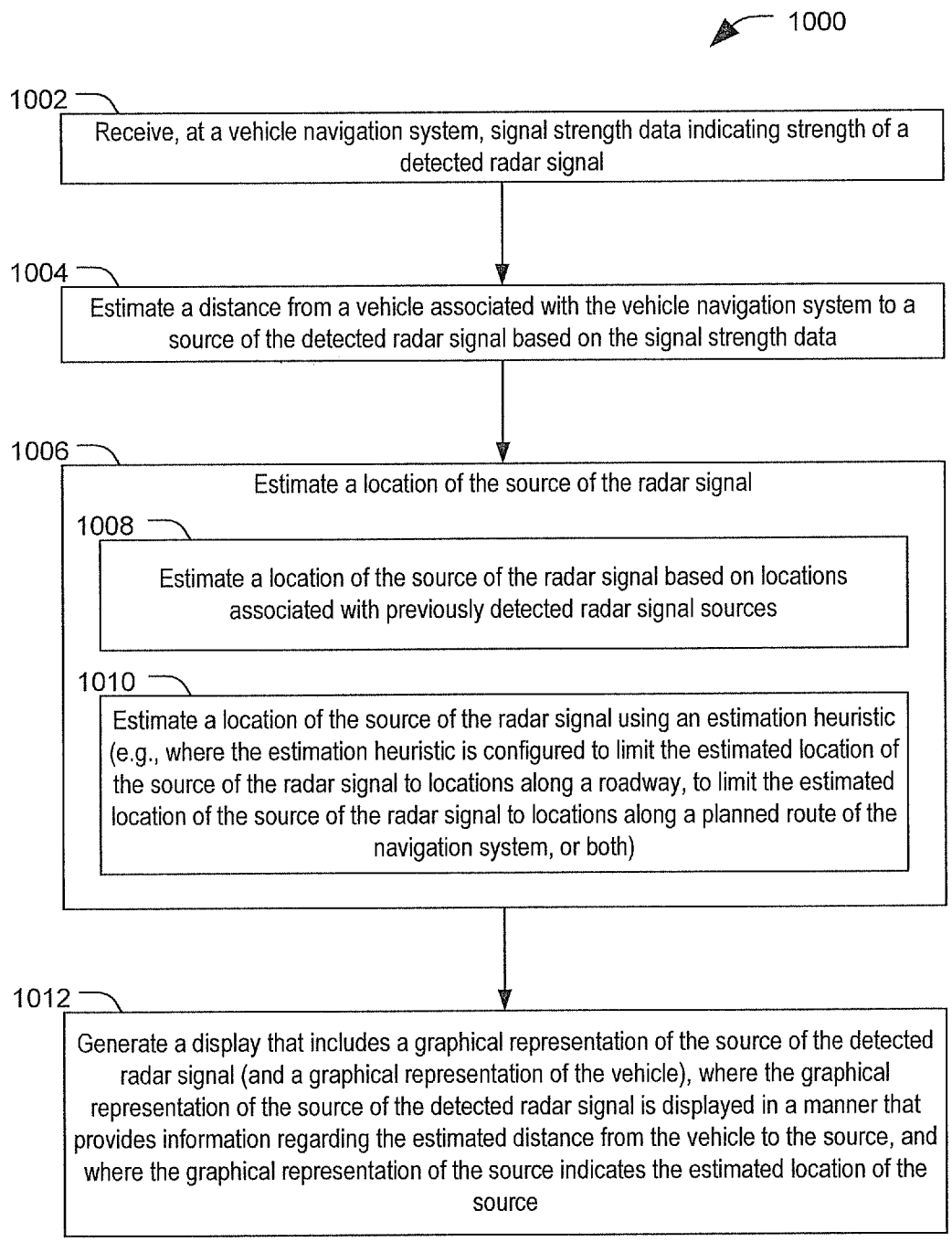
FIG. 10 is a flow chart of a fourth particular embodiment of a method of displaying information about a detected radar signal.

FIG. 10 is a flow chart of a fourth particular embodiment of a method 1000 of displaying information about a detected radar signal. The method 1000 may be performed by a navigation system of a vehicle, such as the navigation system 130 of FIG. 1, operating in conjunction with a radar detector, such as the radar detector 110 of FIG. 1.

The method 1000 includes, at 1002, receiving signal strength data indicating strength of a detected radar signal. For example, the signal strength data may be received by the navigation system 130 of FIG. 1 from the radar detector 110. The method 1000 also includes, at 1004, estimating a distance from a vehicle associated with the vehicle navigation system to a source of the detected radar signal based on the signal strength data. For example, the navigation system 130 may estimate the distance to the source 104 based on the signal strength data and the calibration data 164.

The method 1000 may also include, at 1006, estimating a location of the source of the radar signal. The location of the source may be estimated, at 1008, based on locations associated with previously detected radar signal sources. For example, when the navigation system includes a memory including location information regarding previously detected sources, a location of the navigation system and the estimated distance may be compared to the location information regarding the previously detected sources. One or more previously detected sources that are approximately at the estimated distance (and direction if direction information has been determined) may be indicated as possible locations of the source.

The location of the source of the radar signal may also, or in the alternative, be estimated, at 1010, using an estimation heuristic. The estimation heuristic may be adapted to select probable locations of the source based on information available to the navigation system, such as the signal strength data, direction data, map data, calibration data, route data, or a combination thereof. To illustrate, in a particular embodiment, the estimation heuristic is configured to limit the estimated location of the source of the radar signal to locations that are along a roadway. In this embodiment, the graphical representation related to the source may include an arc or line in a map display of the navigation system. The arc or line may be shown at a location along a roadway that is at a distance corresponding to the estimated distance to the source. In another illustrative embodiment, the estimation heuristic is configured limit the estimated location of the source of the radar signal to locations that are along a planned route of the navigation system. In this illustrative embodiment, the graphical representation related to the source may include an arc or line in front of the vehicle in a map display of the navigation system, where the arc or line is shown at a location along a roadway in front of the vehicle that is at a distance corresponding to the estimated distance to the source. The arc or line may be shown in only front of the vehicle because the planned route, generally, is expected to be in front of the vehicle.

The method 1000 may also include, at 1012, generating a display that includes the graphical representation related to the source (and possibly a graphical representation of the vehicle). For example, the graphical representation related to the source may include an open geometric shape (such as an arc or line) or a closed geometric shape (such as a circle or ellipse) around the graphical representation of the vehicle. Various graphical representations of the vehicle and the source are described with reference to FIGS. 2-6. The graphical representation related to the source may be displayed in a manner that provides information regarding the estimated distance from the vehicle to the source. For example, the graphical representation related to the source may be color coded to indicate the distance. In another example, a size of the graphical representation related to the source in the display may indicate the distance. In another example, another display characteristic (such as a flashing or steady image) or combination of display characteristics (e.g., a color and a size) may be used to indicate the distance. In a particular embodiment, the graphical representation related to the source may indicate the estimated location of the source. An example of a graphical representation related to a source indicating the estimated location of the source is described with reference to FIG. 3.

Accordingly, the method 1000 may enable the vehicle navigation system to interact with a radar detector to present information about a detected radar signal. The vehicle navigation system may present the information about the detected radar signal using easily understandable visual cues. Thus, a user (e.g., a driver of the vehicle) may be able to quickly evaluate the information presented with little distraction, e.g. from driving.

Figure 11:
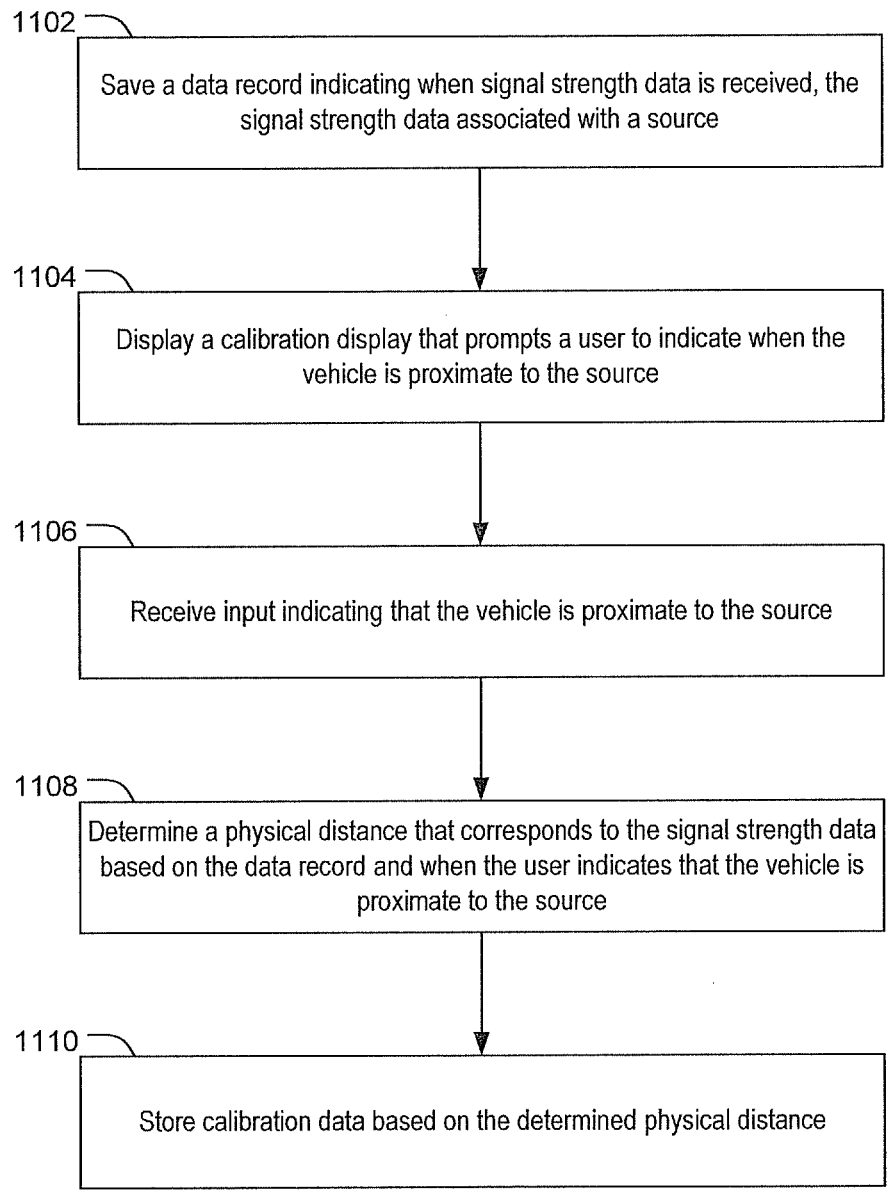
FIG. 11 is a flow chart of a particular embodiment of a method of calibrating display of information about a detected radar signal.

FIG. 11 is a flow chart of a particular embodiment of a method of calibrating display of information about a detected radar signal. The method 1100 may be performed by a navigation system of a vehicle, such as the navigation system 130 of FIG. 1, operating in conjunction with a radar detector, such as the radar detector 110 of FIG. 1. The method 1100 illustrates calibrating the navigation system to estimate distances by determining a relationship between signal strength data and physical distances. The method 1100 may be performed before the navigation system is used to estimated distances associated with detected radar signals or may be performed occasionally or periodically (e.g., in response to a request by a user) to update or refine calibration of the navigation system. In a particular embodiment, the method 1100 may be performed in response to a user selection of a user-selectable option to calibrate the navigation system (such as the user-selectable option 224 one or more of FIGS. 2-6).

The method 1100 may include, in response to receiving signal strength data from a radar detector while in a calibration mode, at 1102, saving a data record indicating when the signal strength data is received. For example, the data record may include a timestamp that indicates when the signal strength data was received. The data record may also include a value associated with the signal strength data.

Figure 12:
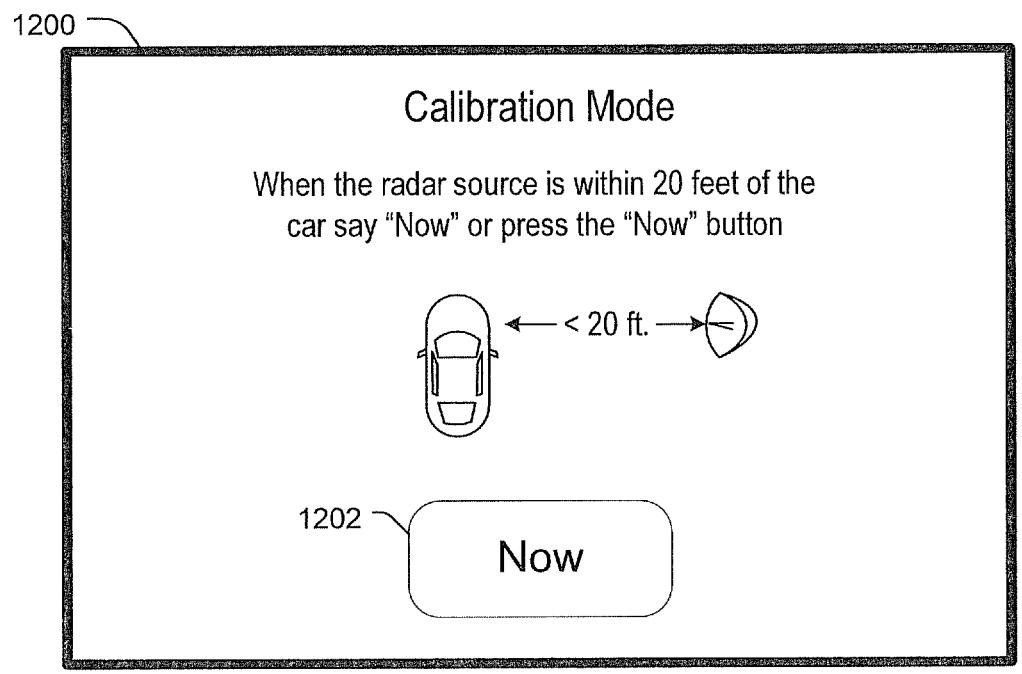
FIG. 12 is an illustration of a particular embodiment of a navigation system calibration display.

The method 1100 may include, at 1104, displaying a calibration display that prompts a user to indicate when the vehicle is proximate to the source. The calibration display may include one or more selectable elements displayed along with a graphical representation of a source of a radar signal (e.g., in one of the displays shown in FIGS. 2-6). In another example, the calibration display may be a separate display screen. An example of a calibration display 1200 as a separate display screen is shown in FIG. 12. Whether the calibration display is separate or integral with another display, the calibration display may include instructions that assist the user with performing the calibration. Additionally or in the alternative, the calibration display may include a user selectable option (such as the user selectable option 1202 of FIG. 12 or the calibrate option 224 of FIGS. 2-6) that is selectable by the user to indicate that the vehicle is proximate to the source. In the calibration mode, the user may be directed to indicate (either the user selectable option or via a voice command) when the radar source is within about 20 feet of the vehicle. The distance of 20 feet is shown merely for purposed of illustration. In other embodiments, a distance that is greater than 20 feet or less than 20 feet may be selected to indicate that the vehicle is proximate to the source. In still other embodiments, no specific distance may be used to prompt the user. Rather, the user may be prompted to indicate when the vehicle has a particular physical arrangement relative to the source (e.g., is in a roadway lane adjacent to the source and approximately even with the source).

The method 1100 may also include, at 1106, receiving input indicating that the vehicle is proximate to the source. For example, in FIG. 12, the input may be received via selection of the user selectable option 1202 or via a voice command. In other embodiments, the input may be received via another mechanism, such as selection of a steering wheel mounted button.

The method 1100 may also include, at 1108, determining a physical distance that corresponds to the signal strength data based on the data record and when the user indicates that the vehicle is proximate to the source. A travel speed of the vehicle between when the signal strength data was received and when the user indicates that the vehicle is proximate to the source may also be used to estimate the physical distance. In a particular embodiment, successive or iterative calibrations may be averaged out to reduce operator error. Alternately, a subsequent calibration may cause calibration data from a previous calibration to be overwritten.

The method 1100 may also include, at 1110, storing calibration data based on the determined physical distance. The calibration data may be used subsequently to determine an estimated distance to source of another detected radar signal.

Figure 13:
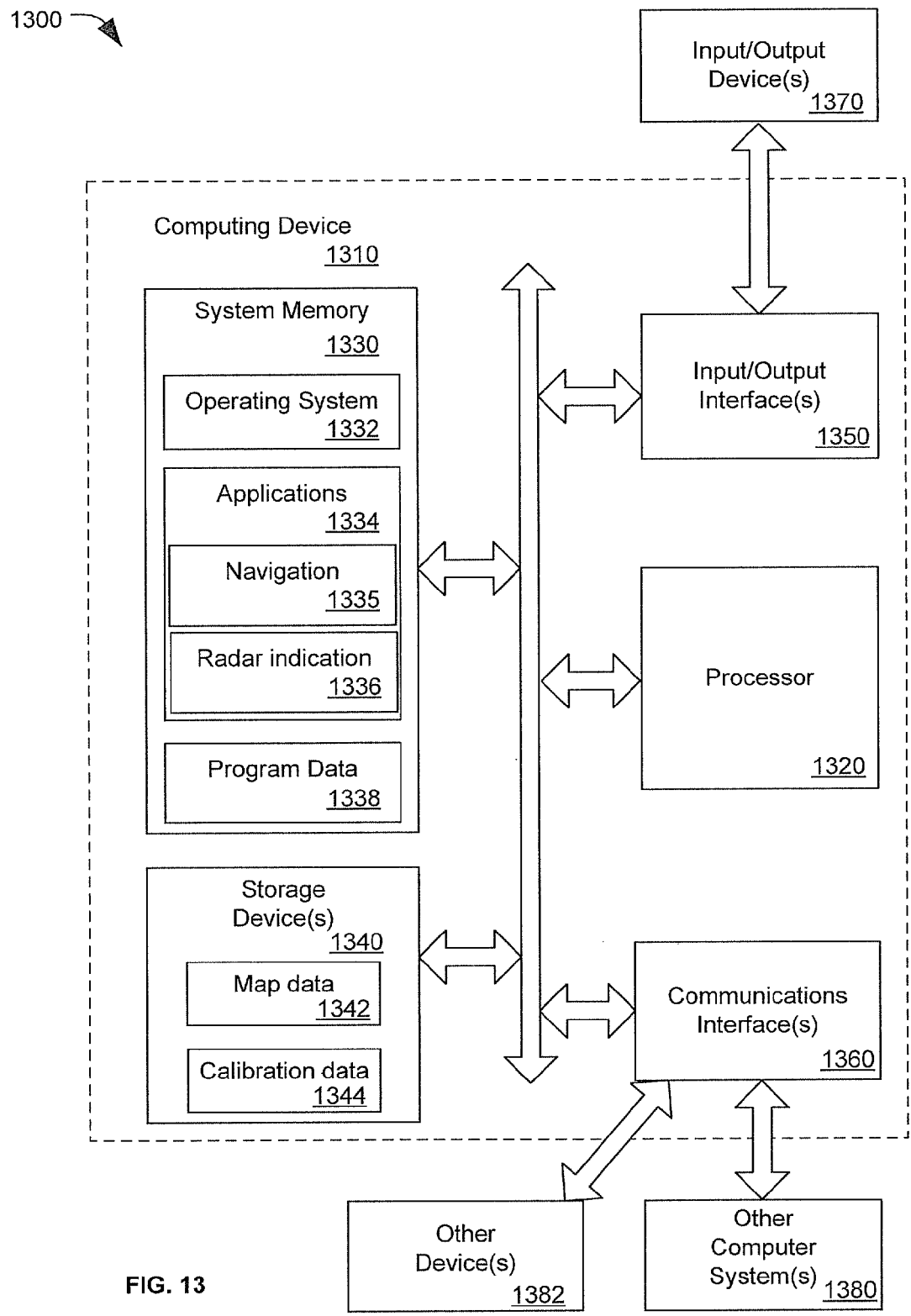
FIG. 13 is a block diagram of a computing environment including a general purpose computing device operable to support embodiments of computer-implemented methods and computer-executable program instructions (or code) for displaying information about a detected radar signal.

FIG. 13 is a block diagram of a computing environment 1300 including a general purpose computing device 1310 operable to support embodiments of computer-implemented methods and computer-executable program instructions (or code) to enable interaction between a radar detector and a navigation system. For example, the computing device 1310, or portions thereof, may be operable to provide receive data (e.g., signal strength data, direction data, other data, or a combination thereof) from a radar detector and to generate a display that include a graphical representation associated with the data received from the radar detector. To illustrate, the computing device 1310 may correspond to the navigation system 130 of FIG. 1.

The computing device 1310 may include at least one processor 1320. Within the computing device 1310, the at least one processor 1320 may communicate with a system memory 1330, one or more storage devices 1340, one or more input/output interfaces 1350, one or more communications interfaces 1360, or a combination thereof.

The system memory 1330 may include volatile memory devices (e.g., random access memory (RAM) devices), nonvolatile memory devices (e.g., read-only memory (ROM) devices, programmable read-only memory, and flash memory), or both. The system memory 1330 may include an operating system 1332, which may include a basic/input output system for booting the computing device 1310 as well as a full operating system to enable the computing device 1310 to interact with users, other programs, and other devices. The system memory 1330 also typically includes one or more applications 1334, such as a navigation application 1335, and a radar indication application 1336. For example, the navigation application 1335 may include, correspond to, or be included within the navigation and route planning instructions 150 of FIG. 1, and the radar indication application 1336 may include, correspond to, or be included within the radar detector interoperability instructions 162 of FIG. 1. The system memory 1330 also may include program data 1338. The program data 1338 may include data used by the applications 1334 to perform respective functions of the applications 1334. To illustrate, the program data 1338 or the applications 1334 may include artificial intelligence algorithms, heuristics or other executable systems and rules to enable generation of a display that includes a graphical representation related to a source of a detected radar signal in a manner that provides information regarding an estimated distance from a vehicle to the source. As another example, the program data 1338 or the applications 1334 may include artificial intelligence algorithms, heuristics or other executable systems and rules to estimate a probable location of the source of the detected radar signal, to account for terrain, weather, obstructions, or other factors that may affect estimation of the probable location of the source.

The processor 1320 may also communicate with one or more storage devices 1340. For example, the one or more storage devices 1340 may include nonvolatile storage devices, such as magnetic disks, optical disks, or flash memory devices. The storage devices 1340 may include both removable and non-removable memory devices. The storage devices 1340 may be configured to store an operating system, applications and program data. In a particular embodiment, the system memory 1330, the storage devices 1340, or both, include tangible, non-transitory computer-readable media. The storage devices 1340 may store data used by one or more of the applications 1334. For example, the storage devices 1340 may include map data 1342 (such as the map data 152 of FIG. 1), calibration data 1344 (such as the calibration data 164 of FIG. 1), or both.

The processor 1320 may also communicate with one or more input/output interfaces 1350 that enable the computing device 1310 to communicate with one or more input/output devices 1370 to facilitate user interaction. The input/output interfaces 1350 may include serial interfaces (e.g., universal serial bus (USB) interfaces or IEEE 1394 interfaces), parallel interfaces, display adapters, audio adapters, and other interfaces. The input/output devices 1370 may include buttons, keyboards, pointing devices, displays, speakers, microphones, touch screens, and other devices.

The processor 1320 may communicate with other computer systems 1380 and/or other devices 1382 (e.g., the radar detector 110 of FIG. 1) via the one or more communications interfaces 1360. The one or more communications interfaces 1360 may include wired Ethernet interfaces, IEEE 802 wireless interfaces, Bluetooth communication interfaces, electrical, optical or radio frequency interface, or other wired or wireless interfaces. The other computer systems 1380 may include host computers, servers, workstations, or vehicle information, diagnostic or control systems.

Embodiments described above illustrate but do not limit the disclosure. It should also be understood that numerous modifications and variations are possible in accordance with the principles of the present disclosure. Accordingly, the scope of the disclosure is defined only by the following claims.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than is shown in the figures or one or more method steps may be omitted. In another example, particular method steps may be performed in parallel with one another rather than sequentially. Accordingly, the disclosure and the figures are to be regarded as illustrative rather than restrictive.

Moreover, although specific embodiments have been illustrated and described herein, it should be appreciated that any subsequent arrangement designed to achieve the same or similar results may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, the claimed subject matter may be directed to less than all of the features of any of the disclosed embodiments.

What is claimed is:

1. A method comprising:
    receiving, at a vehicle navigation system, signal strength data indicating a strength of a detected radar signal;
    determining an estimated distance from a vehicle associated with the vehicle navigation system to a source of the detected radar signal based on the signal strength data;
    generating a display that includes a graphical representation related to the source of the detected radar signal, wherein the graphical representation related to the source is displayed in a manner that provides information regarding the estimated distance from the vehicle to the source;
    accessing map data from a memory of the vehicle navigation system; and
    identifying, by a processor of the vehicle navigation system, a potential obstruction between the vehicle and the source based on the map data and the estimated distance from the vehicle to the source.

2. The method of claim 1, wherein the graphical representation related to the source includes a closed geometric shape around a visual representation of the vehicle.

3. The method of claim 1, wherein the graphical representation related to the source includes a circle around a visual representation of the vehicle.

4. The method of claim 1, further comprising receiving direction data indicating a direction from the vehicle to the source of the detected radar signal, wherein the graphical representation related to the source includes information regarding the direction from the vehicle to the source.

5. The method of claim 1, further comprising comparing the estimated distance from the vehicle to the source to topographical data, wherein the graphical representation related to the source is based on the topographical data.

6. The method of claim 1, wherein the potential obstruction corresponds to an elevation change indicated in topographic data of the map data.

7. The method of claim 1, wherein the potential obstruction corresponds to a structure indicated in the map data.

8. The method of claim 1, wherein the graphical representation related to the source of the detected radar signal indicates the potential obstruction.

9. The method of claim 1, wherein the potential obstruction is highlighted in the display.

10. The method of claim 1, further comprising determining an estimated location of the source of the radar signal based on locations associated with previously detected radar signal sources, wherein the graphical representation related to the source indicates the estimated location of the source.

11. The method of claim 1, further comprising determining an estimated location of the source of the radar signal using an estimation heuristic, wherein the graphical representation related to the source indicates the estimated location of the source.

12. The method of claim 11, wherein the estimation heuristic is configured to limit the estimated location of the source of the radar signal to locations within a specific distance of a roadway.

13. The method of claim 11, wherein the estimation heuristic is configured to limit the estimated location of the source of the radar signal to locations within a specific distance of a planned route of the navigation system.

14. The method of claim 1, further comprising calibrating stored signal strength to physical distances data before determining the estimated distance, wherein the estimated distance is determined based on the stored signal strength to physical distance data.

15. The method of claim 14, wherein calibrating the stored signal strength to physical distance data includes:
    saving a data record indicating when a second signal strength data is received, the second signal strength data associated with a second source;
    displaying a calibration display that prompts a user to indicate when the vehicle is proximate to the second source;
    determining a physical distance that corresponds to the second signal strength data based on the data record and based on when the user indicates that the vehicle is proximate to the second source; and
    updating the stored signal strength to physical distance data to include the physical distance and the second signal strength.

16. A system comprising:
    a memory comprising instructions executable by a processor to cause the processor to:
        receive signal strength data from a radar detection device, the signal strength data indicating a strength of a detected radar signal;
        determine, based on the signal strength data, an estimated distance from a vehicle associated with the radar detection device to a source of the detected radar signal;

generate a display that includes a graphical representation related to the source of the detected radar signal, wherein the graphical representation related to the source is displayed in a manner that provides information regarding the estimated distance from the vehicle to the source;

access map data from the memory; and identify, based on the map data and the estimated distance from the vehicle to the source, a potential obstruction between the vehicle and the source; and a processor configured to execute the instructions.

17. The system of claim 16, wherein the instructions are further executable to cause the processor to determine an estimated location of the source of the radar signal, wherein the display indicates the estimated location of the source.

18. The system of claim 16, wherein the instructions are further executable to cause the processor to receive direction data indicating a direction from the vehicle to the source of the detected radar signal, wherein the display provides information regarding the direction from the vehicle to the source.

19. A non-transitory computer-readable medium comprising instructions that are executable by a processor to cause the processor to:

receive signal strength data from a radar detection device, the signal strength data indicating a strength of a detected radar signal;

determine, based on the signal strength data, an estimated distance from a vehicle associated with the radar detection device to a source of the detected radar signal; and generate a display that includes a graphical representation related to the source of the detected radar signal, wherein the graphical representation related to the source is displayed in a manner that provides information regarding the estimated distance from the vehicle to the source;

access map data from a memory; and identify, based on the map data and the estimated distance from the vehicle to the source, a potential obstruction between the vehicle and the source.

20. The non-transitory computer-readable medium of claim 19, wherein the potential obstruction corresponds to an elevation change indicated in topographic data of the map data.

* * * * *